W. J. JOHNSON.
Soap-Holder.

No. 167,769. Patented Sept. 14, 1875.

WITNESSES;
Arthur M. Keith.
Arthur L. Plimpton.

INVENTOR;
William J. Johnson

UNITED STATES PATENT OFFICE.

WILLIAM J. JOHNSON, OF NEWTON, MASSACHUSETTS.

IMPROVEMENT IN SOAP-HOLDERS.

Specification forming part of Letters Patent No. 167,769, dated September 14, 1875; application filed July 13, 1875.

*To all whom it may concern:*

Be it known that I, WILLIAM J. JOHNSON, of Newton, in the county of Middlesex and Commonwealth of Massachusetts, have invented certain new and useful Improvements in Soap-Holders; and I do hereby declare that the following is a full, clear, and exact description of the same, reference being had to the accompanying drawings forming a part of this specification, and in which—

Figure 1:
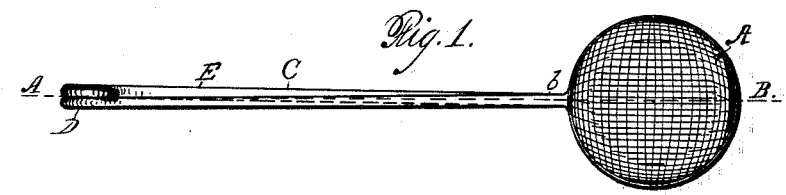
Figure 2:
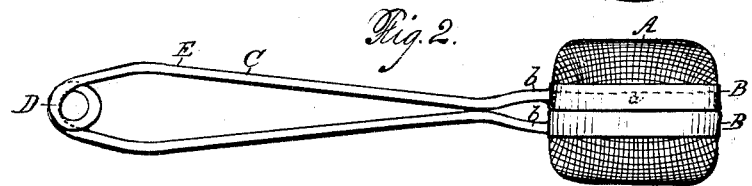
Figure 3:
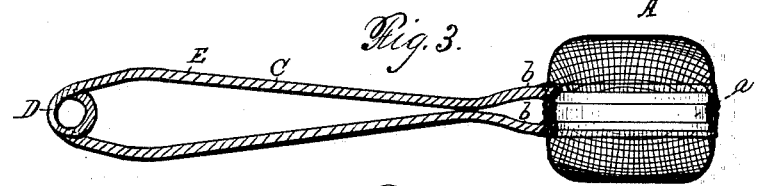
Figure 4:
Figure 5:
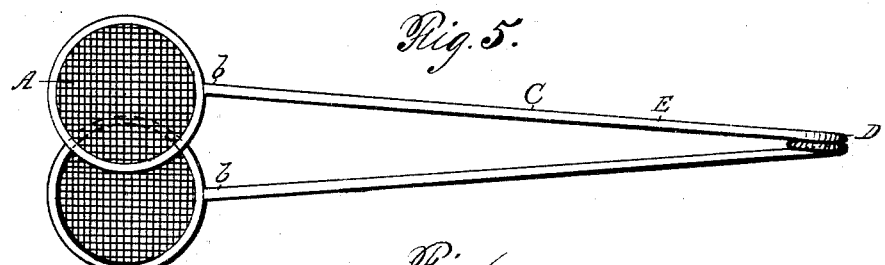
Figure 6:
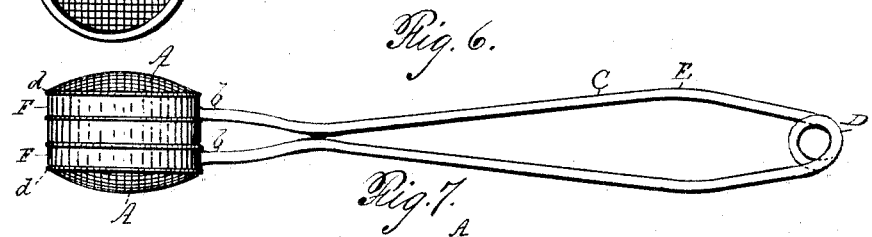
Figure 7:

Figure 1 represents an end view of my improved soap-holder. Fig. 2 represents a side view of the same; and Fig. 3 represents a section on line A B, Fig. 1. Fig. 4 represents an end view of a modified form of the holder. Fig. 5 represents the same holder partly opened for the reception of the soap. Fig. 6 represents a side view; and Fig. 7 represents a section on line C D, Fig. 4.

To enable those skilled in the art to which my invention belongs to make and use the same, I will proceed to describe it more in detail.

My improved soap-holder (shown in Fig. 1) is made with fine woven-wire ends A, these ends being made separate and somewhat cone-shaped, with their open ends secured to tin or sheet-metal flange-pieces B B, said flange-pieces being made double, so as to receive and hold the wire edges of the end pieces A A, which are pressed or clamped securely between said doubled or folded parts of the flange-pieces B B. Flange-pieces B B are also so made that a flange, *a*, upon the inside of one will shut into the inside of the other, similar to a tea or coffee pot cover. To the metal flanges B B are secured the ends *b b* of a wire handle, C, which is formed from a single piece of wire having a spring-coil, D, upon its center, as fully shown in the drawings. To open the soap-holder, the ends A A are sprung apart sufficiently to allow them to be sprung laterally, as indicated in Fig. 5, when the piece of soap can be placed in one of the ends, after which the soap-holder is closed, as indicated in Figs. 1, 2, and 6, the spring-coil D being sufficient to keep the ends of the soap-holder together, while, when the article is in use, the hand of the operator, grasping the part E of the handle, tends to keep the holder closed. The soap-holder can be opened, if desired, so as to receive a piece of soap sufficient to fill both ends of the holder. In Figs. 4, 5, 6, and 7 a soap-holder is shown, having woven-wire ends A, of less size than those shown in Figs. 1, 2, and 3, since the wire netting does not extend down over the sides of the holder, which is made of sheet metal or tin, as shown at F F, Figs. 6 and 7; but said tin or sheet-metal parts F F are made to close together by having a flange on one which passes or slips into the open end of the other, the same as in the soap-holder shown in Figs. 1, 2, and 3. The flange parts B B and F F may be made in any desirable form and manner. In Fig. 6 they are represented as being made with raised ribs *d d*, which gives the article a somewhat more finished appearance. When the article is not in use, the ring formed by the spring-coil D furnishes a convenient loop by which the article can be hung up.

In washing dishes, the housekeeper or servant has only to take hold of handle C and insert the soap-holder in the water, and give it a few passes, when the water, passing through the holder from end to end, will dissolve and remove soap enough for the desired use. The wire meshes, when the article is moved back and forth in the water, permits the water to pass through the soap-holder from end to end, and which motion of the water, in connection with the motion of the holder, causes the soap to abrade against the roughened surface of the wire-cloth ends.

Having described my improved soap-holder, what I claim therein as new and of my invention, and desire to secure by Letters Patent, is—

1. The combination, with a soap-box made in two parts, as set forth, of a spring-wire handle having one of its ends attached to one part of the box and the other to the other part of the box, and formed substantially as shown and described, so that while normally holding together the two parts of the box the pressing together of its outer portion will have the effect of separating said parts, as specified.

2. The combination, with the woven-wire ends A A and flanges, of spring-wire handle C, substantially as and for the purposes set forth.

WILLIAM J. JOHNSON.

Witnesses:
ARTHUR M. KEITH,
ARTHUR L. PLIMPTON.